United States Patent
Kobe et al.

(10) Patent No.: US 12,529,665 B2
(45) Date of Patent: Jan. 20, 2026

(54) HYDROGEN PEROXIDE STERILIZATION SENSOR INCLUDING THERMAL INDICATOR COMPONENT AND REACTANT-FUNCTIONAL SORBENT, AND METHOD OF USE

(71) Applicant: Solventum Intellectual Properties Company, Maplewood, MN (US)

(72) Inventors: Michael W. Kobe, Lake Elmo, MN (US); Michael S. Wendland, North St. Paul, MN (US); Richard C. Webb, St. Paul, MN (US); Michael E. Hamerly, Vadnais Heights, MN (US); Giuseppe Marco Bommarito, Stillwater, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 861 days.

(21) Appl. No.: 17/712,223

(22) Filed: Apr. 4, 2022

(65) Prior Publication Data

US 2022/0390399 A1      Dec. 8, 2022

Related U.S. Application Data

(60) Provisional application No. 63/192,903, filed on May 25, 2021.

(51) Int. Cl.
   *G01N 25/48*    (2006.01)
   *A61L 2/20*     (2006.01)

(52) U.S. Cl.
   CPC .......... *G01N 25/482* (2013.01); *A61L 2/208* (2013.01); *G01N 25/488* (2013.01)

(58) Field of Classification Search
   CPC .. G01N 25/482; G01N 25/488; G01N 31/226; A61L 2/208; A61L 2/26;
   (Continued)

(56) References Cited

U.S. PATENT DOCUMENTS

| | | | |
|---|---|---|---|
| 3,907,720 A | 9/1975 | Field | |
| 3,910,761 A | * 10/1975 | Hopkins | ................ G05B 19/07 422/108 |

(Continued)

FOREIGN PATENT DOCUMENTS

| | | |
|---|---|---|
| EP | 0818676 | 1/1998 |
| JP | H01130719 | 5/1989 |

(Continued)

OTHER PUBLICATIONS

Hussein, et al., "New technologies for active disassembly: using the shape memory effect in engineering polymers", J. Product Development, vol. 6, Nos. 3 and 4, (2008), pp. 431-449.

(Continued)

*Primary Examiner* — Jill A Warden
*Assistant Examiner* — Dwayne K Handy

(57) ABSTRACT

The present disclosure provides a hydrogen peroxide sterilization sensor and method of use. The sensor includes: at least one thermal indicator component independently selected from an electronic thermal sensor, an irreversible temperature indicator, and a heat-shrinkable film; a reactant-functional porous sorbent in thermal contact (which may or may not be direct physical contact) with the at least one thermal indicator component; and a reactant comprising a material that reacts exothermically with hydrogen peroxide. The reactant is impregnated in the porous sorbent. The method includes: providing a hydrogen peroxide sterilization sensor; allowing hydrogen peroxide to contact the reactant to generate thermal energy sufficient to cause a response from the at least one thermal indicator component; and detecting that conditions for the hydrogen peroxide sterilization have been met.

11 Claims, 6 Drawing Sheets

(58) Field of Classification Search
CPC .......... A61L 2/00; A61L 2/28; A61L 2202/14; A61L 2101/00; C12M 37/00; C12M 37/06
See application file for complete search history.

(56) References Cited

U.S. PATENT DOCUMENTS

| | | | |
|---|---|---|---|
| 4,436,858 A | | 3/1984 | Klosiewicz |
| 4,756,758 A | * | 7/1988 | Lent et al. ............. C09D 11/50 106/31.32 |
| D315,600 S | | 3/1991 | Niven |
| 5,145,935 A | | 9/1992 | Hayashi |
| 5,155,199 A | | 10/1992 | Hayashi |
| RE34,515 E | | 1/1994 | Foley |
| 5,451,372 A | | 9/1995 | Larsson |
| 5,506,300 A | | 4/1996 | Ward |
| 5,665,822 A | | 9/1997 | Bitler |
| 5,700,375 A | | 12/1997 | Hagen |
| 5,879,631 A | | 3/1999 | Wewers |
| 5,980,827 A | | 11/1999 | Messier |
| 6,160,084 A | | 12/2000 | Langer |
| 6,388,043 B1 | | 5/2002 | Langer |
| 6,423,421 B1 | | 7/2002 | Banaszak |
| 6,451,272 B1 | | 9/2002 | Fryer |
| 7,173,096 B2 | | 2/2007 | Mather |
| 7,893,179 B2 | | 2/2011 | Anderson |
| 9,134,251 B2 | | 9/2015 | Thomas |
| 9,563,833 B2 | | 2/2017 | Swager |
| 10,400,050 B2 | | 9/2019 | Wendland |
| 2001/0036670 A1 | * | 11/2001 | Fryer et al. .......... G01N 31/226 436/135 |
| 2002/0152792 A1 | * | 10/2002 | Wang et al. ....... G01N 27/4163 73/1.02 |
| 2005/0194441 A1 | * | 9/2005 | Truong ................. A61L 2/208 235/385 |
| 2005/0244353 A1 | | 11/2005 | Lendlein |
| 2006/0041089 A1 | | 2/2006 | Mather |
| 2006/0042209 A1 | | 3/2006 | Dallas |
| 2007/0009465 A1 | | 1/2007 | Lendlein |
| 2008/0273572 A1 | | 11/2008 | Lawrence |
| 2010/0081165 A1 | * | 4/2010 | Pasmore et al. ....... C12M 37/06 435/31 |
| 2014/0057360 A1 | * | 2/2014 | Neff et al. ........... G01N 31/226 436/135 |
| 2019/0025268 A1 | * | 1/2019 | Cregger et al. ...... G01N 31/228 436/135 |
| 2020/0278263 A1 | * | 9/2020 | Tsubouchi ............... G01K 3/04 |
| 2021/0154347 A1 | | 5/2021 | Kobe |

FOREIGN PATENT DOCUMENTS

| | | |
|---|---|---|
| JP | H03125950 | 5/1991 |
| JP | 2011092939 | 5/2011 |
| KR | 20060016658 | 2/2006 |
| RU | 2003133948 | 5/2005 |
| WO | WO 2006-117328 | 11/2006 |
| WO | WO 2009-138706 | 11/2009 |
| WO | WO 2019-043580 | 3/2019 |

OTHER PUBLICATIONS

Kobe, et al., "Ethylene Oxide Sterilization Sensor Including Thermal Indicator Component and Acid-Functional Sorbent or Nonwoven Fibrous Substrate, and Method of Use", U.S. Appl. No. 17/708,475, filed Mar. 30, 2022, 36 pages.

Wendland, et al., "Ammonia Sensor Including Thermal Indicator Component and Acid-Functional Sorbent, and Method of Use", U.S. Appl. No. 17/708,533, filed Mar. 30, 2022, 42 pages.

* cited by examiner

HYDROGEN PEROXIDE STERILIZATION SENSOR INCLUDING THERMAL INDICATOR COMPONENT AND REACTANT-FUNCTIONAL SORBENT, AND METHOD OF USE

BACKGROUND

Vaporized hydrogen peroxide (VHP) is one of four typical forms of sterilization along with steam, ethylene oxide (EO), and ultraviolet (UV). An advantage to using VHP over EO for sterilization of medical equipment is that it readily breaks down into water and oxygen so no extended aeration or abatement is needed like it is for EO. Hydrogen peroxide is used at low temperatures to sterilize temperature sensitive materials and equipment and is usually performed in a sealed chamber. Often, such a chamber is packed with materials and equipment during the sterilization process.

With the chamber typically being filled to capacity during the sterilization process, it is not uncommon for areas in the chamber to never see full exposure to VHP resulting in some items not being properly sterilized. It is important then to have sensors scattered throughout the chamber that can be analyzed to ensure that proper and complete sterilization occurred everywhere. These sensors can be indicators, which indicate that one process condition has been met, or integrators, which indicate two or more process conditions have been met.

Process conditions include VHP concentration, time, relative humidity (RH), and pressure. The most reliable method of sterilization indication is using biological indicators. In this method, tubes containing spores are placed in various locations throughout the chamber. Upon completion of the sterilization cycle, the tubes are collected from the chamber and analyzed to ensure that the spores have been killed. It can be common for dozens of tubes to be used for each cycle. Analysis of each tube takes at least 24 minutes to complete, so it can take hours after a cycle is complete to ensure proper sterilization occurred. The biological indicators are also more expensive compared to other indicators.

SUMMARY

In a first aspect, the present disclosure provides a hydrogen peroxide sterilization sensor. The sensor comprises: at least one thermal indicator component independently selected from an electronic thermal sensor, an irreversible temperature indicator, or a heat-shrinkable film; a reactant-functional porous sorbent in thermal contact (which may or may not be direct physical contact) with the at least one thermal indicator component; and a reactant comprising a material that reacts exothermically with hydrogen peroxide, wherein the reactant is impregnated in the porous sorbent.

In a second aspect, the present disclosure provides an array comprising a plurality of the hydrogen peroxide sterilization sensors according to the first aspect.

In a third aspect, the present disclosure provides a method of detecting hydrogen peroxide in a sterilization process. The method comprises: providing a hydrogen peroxide sterilization sensor; allowing hydrogen peroxide to contact the reactant to generate thermal energy sufficient to cause a response from the at least one thermal indicator component; and detecting that conditions for hydrogen peroxide sterilization have been met.

This sensor utilizes an exothermic interaction between hydrogen peroxide and the reactant in contact with the (high surface area) porous sorbent. The heat generated from the interaction, which is either catalytic or reactive, causes a detectable response from the thermal indicator component(s), for instance a dimensional change in a heat-shrinkable film and/or an electronic signal (or end to an electronic signal) in an electronic thermal sensor. The detectable response from the thermal indicator component(s), as a result of this activation by hydrogen peroxide, is what indicates that conditions for hydrogen peroxide sterilization have been met (e.g., proper sterilization).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWINGS

FIG. 1 is a schematic top view of one embodiment of a hydrogen peroxide sterilization sensor of the present disclosure, wherein

FIG. 3 is a schematic top view of an alternative embodiment of a hydrogen peroxide sterilization sensor of the present disclosure, wherein

FIG. 6 is a representation of the hydrogen peroxide sterilization sensor of FIG. 5 before activation by hydrogen peroxide, wherein

FIG. 7 is a representation of the hydrogen peroxide sterilization sensor of FIG. 5 after activation by hydrogen peroxide, wherein

Figure 1A:
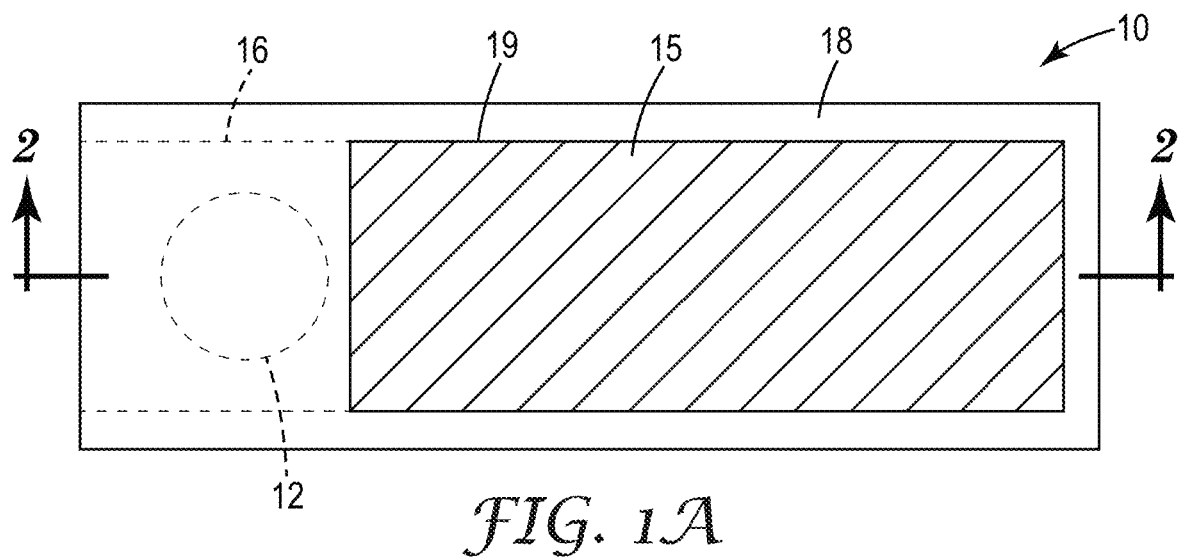
FIG. 1a represents the sterilization sensor before activation by hydrogen peroxide and FIG. 1b represents the sterilization sensor after activation by hydrogen peroxide.

While the above-identified figures set forth several embodiments of the disclosure, other embodiments are also

DETAILED DESCRIPTION OF ILLUSTRATIVE EMBODIMENTS

Glossary

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

In this application, terms such as "a," "an," and "the" are not intended to refer to only a singular entity but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "and/or" means one or all the listed elements or a combination of any two or more of the listed elements. The term "or" is generally employed in its usual sense including "and/or" unless the content clearly dictates otherwise.

Also, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The present disclosure provides a hydrogen peroxide sterilization sensor that includes one or more thermal indicator component(s) and a reactant-functional sorbent. In a first aspect, a hydrogen peroxide sterilization sensor comprises:

- at least one thermal indicator component independently selected from an electronic thermal sensor, an irreversible temperature indicator, and a heat-shrinkable film;
- a reactant-functional porous sorbent in thermal contact with the at least one thermal indicator component; and
- a reactant comprising a material that reacts exothermically with hydrogen peroxide, wherein the reactant is impregnated in the porous sorbent.

In a second aspect, the present disclosure provides an array comprising a plurality of the hydrogen peroxide sterilization sensors according to any embodiment(s) of the first aspect. The array may include a plurality of the same sensor or any combination of different embodiments of the hydrogen peroxide sterilization sensors described in the first aspect.

In a third aspect, the present disclosure also provides a method of detecting hydrogen peroxide in a sterilization process. The method comprises:

- providing a hydrogen peroxide sterilization sensor (according to any embodiment of the first aspect);
- allowing hydrogen peroxide to contact the reactant to generate thermal energy sufficient to cause a response from the at least one thermal indicator component; and
- detecting that conditions for hydrogen peroxide sterilization have been met.

Optionally, the detecting completion comprises exposing an underlying image.

Each of the first, second, and third aspect are discussed in detail below.

In certain embodiments, the reactant-functional porous sorbent is adhered to the thermal indicator component, such as by using an adhesive (e.g., a layer of adhesive). Multiple such hydrogen peroxide sterilization sensors can be incorporated into an array if desired.

This sensor involves a hydrogen peroxide presence indicator that utilizes an exothermic interaction between hydrogen peroxide and the reactant. The heat generated from the interaction, which is either catalytic or reactive, causes a detectable response from the thermal indicator component(s), for instance a dimensional change (i.e., shrinkage) in a heat-shrinkable film, an electronic signal in an electronic thermal sensor, and/or a color change in an irreversible temperature indicator. The detectable response from the thermal indicator component(s), as a result of this activation by hydrogen peroxide, is what indicates that conditions for hydrogen peroxide sterilization have been met. The degree of the response will depend on the amount of heat to which the thermal indicator component is exposed, which will depend on the amount of hydrogen peroxide to which the reactant-functional porous sorbent was exposed.

The at least one thermal indicator component is independently selected from the group consisting of an electronic thermal sensor, an irreversible temperature indicator, and a heat-shrinkable film. When an electronic thermal sensor is present it often comprises at least one of a thermocouple, a resistor, a capacitor, an inductor, or an electronic circuit that changes (e.g., the output voltage or current alters, or at least one portion of the circuit fails) when exposed to a specific minimum elevated temperature. Depending on the particular thermal indicator component, any combination of these are included in an electronic thermal sensor. In some cases, the electronic thermal sensor comprises a thermocouple, e.g., an open junction thermocouple. In various embodiments, for instance and without limitation, T-type, J-type, or E-type thermocouples, may be conveniently used. In some cases, the electronic thermal sensor comprises an electronic circuit that fails when exposed to a specific minimum elevated temperature. Often, the specific minimum elevated temperature is 40 degrees Celsius (° C.), 45° C., 50° C., 55° C. or even 60° C. The electronic circuit may comprise a plurality of electric or electronic components, like, for example, electrodes, wires, capacitors, transistors, resistors, inductors, wire coils, or integrated circuits. The electronic circuit may exhibit a detectable change to its operation as a result of exposure to the specific minimum elevated temperature. The electronic circuit may fail, for instance due to expansion and contraction of at least one component of the circuit, burning/melting of at least one circuit component, a substrate (e.g., heat-shrinkable substrate) that deforms, etc. In some cases, the electronic thermal sensor comprises a resistor. Resistors are well known in the art and their resistance changes with temperature, thus acting as temperature sensors. In some cases, the electronic thermal sensor comprises a capacitor. Capacitors are well known in the art and maintain an electric charge between conductive plates. Some capacitors that are used in sensors change their values in response to a stimulus, such as temperature, thus acting as temperature sensors. In some cases, the electronic thermal sensor comprises an inductor. Inductors are well known in the art. Some inductors that are used in sensors change their values in response to a stimulus, such as temperature, thus acting as temperature sensors.

In some cases, the electronic thermal sensor comprises an RFID (radio-frequency identification) tag. Radio-frequency identification uses electromagnetic fields to identify and track tags, such as RFID tags attached to objects. In operation, an RF reader sends out RF signals (e.g., through an antenna) to create an electromagnetic field. The field activates one or more RFID tags, which each produce a response that provides identifying information back to the RFID reader. When exposed to at least a certain minimum temperature, one or more electronic components of the RFID will fail and no longer produce a response, like an electronic circuit that fails, or a substrate (e.g., shrinkable substrate) that deforms, when exposed to a specific minimum elevated temperature. Once the RF reader ceases to receive the response from the RFID tag that has been exposed to heat, the detectable response from the thermal indicator component comprising an RFID tag is obtained. Alternatively, the RFID tag may have at least one component that provides an altered response to the RF reader in response to heat, to provide a detectable response.

When the irreversible temperature indicator is present, it often comprises a thermochromic dye. Suitable indicators having a thermochromic dye include, for instance, single use multiple-point temperature-indicating labels commercially available from McMaster-Carr (Elmhurst, IL), which can be attached to an object using the adhesive provided on the back of the label and show incremental temperature changes. Such labels operate by including a plurality of windows on the front face of the labels that (permanently) change color, such as by turning from white to black, when the temperature reaches each identified temperature point. For use herein, a reactant-functional porous sorbent is placed in thermal contact with the irreversible temperature indicator, e.g., such as in contact with the adhesive on the back of a temperature-indicating label.

When the heat-shrinkable film is present, the shrinkage of the heat-shrinkable film provides a visual indicator. For example, the original dimensions of the film can simply be noted by an outline around it. Shrinkage of the film results in revealing of the outline. Alternatively, or additionally, shrinkage of the film can reveal an underlying picture, word, colored feature, or differently colored backing substrate.

The sensors of the present disclosure can be tailored by several factors in the construction of the sensor. Such factors include, for example, the sorbent loading in terms of grams sorbent per square meter of an area of the sensor on which the sorbent is disposed, the identity of the reactant, the concentration of reactant in terms of millimoles per gram or weight percent per gram of reactant-functional porous sorbent, and the type of thermal indicator component. When the reactant-functional porous sorbent is adhered to the thermal indicator component using a layer of an adhesive, the layer of adhesive can function as a buffer or insulator. Thus, the thickness of the adhesive can be tailored to control the extent of thermal response from the thermal indicator component.

In certain embodiments, a plurality of hydrogen peroxide sterilization sensors of the present disclosure may be included in an array. In such an array, each of the hydrogen peroxide sterilization sensors may respond differently to hydrogen peroxide. The sensors in the array may vary with respect to the concentration of reactant in the sorbent, the identity of the reactant, type of thermal indicator component, and/or the thickness of an (optional) adhesive. Using this variability between sensors of an array can be utilized, for example, to indicate different levels of hydrogen peroxide.

The heat generated from the interaction of the hydrogen peroxide and the reactant causes a detectable response from the thermal indicator component(s), for instance a dimensional change (i.e., shrinkage) in a heat-shrinkable film, an electronic signal in an electronic thermal sensor, and/or a color change in an irreversible temperature indicator. The detectable response from the thermal indicator component(s), as a result of this activation by hydrogen peroxide, is what indicates that conditions for hydrogen peroxide sterilization have been met. The degree of the response will depend on the amount of heat generated, which is dependent on the amount of hydrogen peroxide to which the reactant-functional porous sorbent was exposed.

Typically, sufficient thermal energy is generated to indicate that conditions for hydrogen peroxide sterilization have been met at a concentration and/or exposure time that is above the required hydrogen peroxide concentration (1-15 mg/L+/−0.1 mg/L) or exposure time (2 to 20 minutes at 50° C.) required for the sterilization process. In some cases, a hydrogen peroxide sterilization sensor detects hydrogen peroxide at a concentration of 100 parts per million (ppm) or greater in a gas (e.g., the gas(es) within a sterilization chamber), such as 200 ppm or greater, 300 ppm or greater, 400 ppm or greater, 500 ppm or greater, 1,000 ppm or greater, 1,500 ppm or greater, 2,000 ppm or greater, 2,500 ppm or greater, 3,000 ppm or greater, 4,000 ppm or greater, or 5,000 ppm or greater; and 50,000 ppm or less hydrogen peroxide in a gas, 25,000 ppm or less, 15,000 ppm or less, or 10,000 ppm or less, hydrogen peroxide in a gas. Stated another way, in certain embodiments, a hydrogen peroxide sterilization sensor detects hydrogen peroxide at a concentration of 100 ppm to 20,000 ppm, 1,000 ppm to 15,000 ppm, or 100 ppm to 50,000 ppm. Other parameters of hydrogen peroxide sterilization processes include water concentration (1-20 mg/L+/−0.1 mg/L) at typical temperatures 50° C. to 60° C. under vacuum (e.g., 0.4-15 torr).

In certain embodiments, the sensor indicates the presence of hydrogen peroxide by exposing an underlying visual indicator (e.g., image). Alternatively, the sensor indicates the presence of hydrogen peroxide by creating a visual indicator on the film. In certain embodiments, the sensor indicates the presence of hydrogen peroxide by producing a detectable response from an electronic thermal sensor.

In certain embodiments, shrinkage in one dimension of a heat-shrinkable film is at least 5%, at least 8%, or at least 10%. In certain embodiments, shrinkage in the total area of a heat-shrinkable film is at least 10%, at least 15%, or at least 18%. In certain embodiments, shrinkage of the film results in separating or tearing perforations in the heat-shrinkable film.

Reactant-Functional Porous Sorbent

A porous sorbent in thermal contact with the thermal indicator component is also in contact with a reactant. In this context, a "reactant" includes compounds that interact exothermically with hydrogen peroxide. The porous sorbent functions as a scaffold for one or more reactants, which is impregnated therein. Hence, such sorbent is referred to herein as an "reactant-functional porous sorbent" when it includes impregnated reactant compounds. The reactant-functional porous sorbent is derived from a porous (e.g., microporous, mesoporous, or macroporous) sorbent material. Once the reactant is impregnated in the porous sorbent, it either partially or completely fills the pores of the porous sorbent.

Examples of reactant compounds that may be incorporated into the porous sorbent include potassium iodide (KI) and iron (II) acetate (Fe(CO$_2$CH$_3$)$_2$). In some embodiments, both potassium iodide and iron (II) acetate can be used in combination. In certain embodiments, potassium iodide is preferred as the reactant compound impregnated in the porous sorbent.

In certain embodiments, the reactant-functional porous sorbent is present in an amount of at least 10 grams per square meter (gsm), at least 20 gsm, or at least 40 gsm, of an area of the sensor on which the sorbent is disposed. In certain embodiments, the reactant-functional porous sorbent is present in an amount of up to 1000 gsm, up to 600 gsm, up to 400 gsm, or up to 250 gsm, of an area of the sensor on which the sorbent is disposed.

In certain embodiments, the reactant compound impregnated in the porous sorbent, to form the reactant-functional porous sorbent, is present in an amount of at least 1 percent by weight (wt. %), at least 2 wt. %, at least 3 wt. %, at least 5 wt. %, at least 7 wt. %, at least 10 wt. %, at least 15 wt. %, at least 20 wt. %, or at least 25 wt. % based on the total weight of the reactant-functional porous sorbent. In certain embodiments, the reactant is present in an amount of up to 80 wt. %, up to 70 wt. %, up to 60 wt. %, up to 50 wt. %, or up to 40 wt. %, based on the total weight of the reactant-functional porous sorbent. In some embodiments, the reactant is present in an amount of 2 wt. % to 20 wt. %, based on the total weight of the reactant-functional porous sorbent.

The "porous" sorbent, into which the reactant gets impregnated, includes minute spaces or holes through which liquid or air may pass. It may include a microporous, mesoporous, or macroporous material. A mesoporous material is a material having pores with diameters of 2 nanometers to 50 nm, a microporous material is a material having pores smaller than 2 nm in diameter, and a macroporous material is a material having pores larger than 50 nm in diameter. The amount of nitrogen gas absorbed by the porous sorbent under cryogenic conditions at a relative pressure of 0.98 may be used to measure the total pore volume for pores having diameters up to 50 nanometers. This method measures both micropores and mesopores. The pore volume of the porous sorbent at a relative pressure of 0.98 is often at least 0.2 cm$^3$/gram, at least 0.4 cm$^3$/gram, at least 0.6 cm$^3$/gram, at least 0.8 cm$^3$/gram, at least 1.0 cm$^3$/gram, or at least 1.2 cm$^3$/gram; and no more than 2.5 cm$^3$/gram. In some embodiments, the pore volume of the porous sorbent is substantially macroporous and has quite low microporosity and mesoporosity.

The porous sorbents are typically porous and often has a BET specific surface area that is in a range of 25 square meters per gram (m$^2$/g) to 5000 m$^2$/g. The BET specific surface area is often at least 25 m$^2$/g, at least 50 m$^2$/g, at least 100 m$^2$/g, at least 200 m$^2$/g, at least 300 m$^2$/g, at least 400 m$^2$/g, or at least 500 m$^2$/g, and up to 5000 m$^2$/g, up to 3000 m$^2$/g, up to 1500 m$^2$/g, up to 1200 m$^2$/g, up to 1100 m$^2$/g, up to 1000 m$^2$/g, 5 up to 900 m$^2$/g, up to 800 m$^2$/g, up to 700 m$^2$/g, up to 600 m$^2$/g, or up to 500 m$^2$/g. In some embodiments, BET specific surface area is in a range of 100 m$^2$/g to 5000 m$^2$/g, or in a range of 200 m$^2$/g to 1000 m$^2$/g. Such surface areas also apply to the reactant-functional porous sorbents.

Porous sorbents include those that can withstand contact with the reactants described herein without degradation. Aqueous solutions are typically used to impregnate potassium iodide and iron (II) acetate, thus suitable porous sorbents will typically be wet out by aqueous solutions. They may include inorganic materials, organic materials, or combinations thereof. Examples include activated carbon, porous silica, zeolites, and porous organic polymers (e.g., hydrolyzed divinyl benzene maleic anhydride copolymers, such as described in U.S. Pat. No. 10,400,050 (Wendland et al.)). Either individual porous sorbents or any combination of porous sorbents may be used if desired.

In certain embodiments, the reactant-functional porous sorbent is encapsulated. To keep the reactant-functional porous sorbent encapsulated, it may be combined with a binder and formed into a monolith or into a composite particle. The monolith or composite particle is placed in thermal contact with the thermal indicator component, thereby causing the reactant-functional porous sorbent to be in thermal contact with the thermal indicator component. The composite construction can be placed in a pouch, for example, that includes holes for passage of the hydrogen peroxide. Alternatively, it can be placed in a container (e.g., physical pack) that defines a tortuous channel for passage of the hydrogen peroxide.

Heat-Shrinkable Film

Useful heat-shrinkable films (i.e., polymer sheets) are also known as shape-memory films (i.e., polymer sheets). Useful heat-shrinkable films may include physically and/or chemically crosslinked polymers.

Suitable physically crosslinked films include linear block copolymers such as thermoplastic polyurethane elastomers with hard segments and soft switching segments. Multi-block copolymers can also serve as films such as, for example, polyurethanes with polystyrene and poly(1,4-butadiene) blocks; ABA tri-block copolymers of poly(tetrahydrofuran) and poly(2-methyl-2-oxazoline); polyhedral oligomeric silsesquioxane (POSS)-modified polynorbornene; and polyethylene/Nylon-6 graft copolymers.

Suitable chemically crosslinked films include, but are not limited to, crosslinked high density polyethylene, crosslinked low-density polyethylene, and crosslinked copolymers of ethylene and vinyl acetate.

Other examples of heat-shrinkable films include polymers selected from polyurethanes, polynorbornenes, polyethers, polyacrylates, polyamides, polysiloxanes, polyether amides, polyether esters, trans-polyisoprenes, polymethyl methacrylates, crosslinked trans-polyoctylenes, crosslinked polyethylenes, crosslinked polycyclooctenes, inorganic-organic hybrid polymers, copolymer blends with polyethylene and styrene-butadiene co-polymers, urethane-butadiene copolymers, polymethyl methacrylate, polycaprolactone, and oligocaprolactone copolymers.

Suitable heat-shrinkable films include polymers such as those described in U.S. Pat. No. 5,506,300 (Ward et al); U.S. Pat. No. 5,145,935 (Hayashi); U.S. Pat. No. 5,665,822 (Bitler et al); U.S. Pat. No. 6,160,084 (Langer); U.S. Pat. No. 6,388,043 (Langer); U.S. Pat. No. 5,155,199 (Hayashi); U.S. Pat. No. 7,173,096 (Mather et al.); U.S. Pat. No. 4,436,858 (Klosiewicz); U.S. Pat. No. 6,423,421 (Banaszak); and U.S. Pat. Appl. Publ. Nos. 2005/244353 (Lendlein et al), U.S. 2007/009465 (Lendlein et al), and 2006/041089 (Mather et al).

Heat-shrinkable polymer films (sheets or rolls) can be processed by heating them to near or above the heat-shrinkable (i.e., shape-memory) transition temperature range of the particular material utilized, then orienting the sheet by stretching or tentoring it in at least one direction (typically down-web when a roll-to-roll process is used) followed by cooling the sheet to lock in the strain caused by the stretching. In some embodiments, the sheet can be oriented in two or more directions. For example, biaxially oriented films can be made by simultaneous down-web and cross-web stretching of the polymer film near or above its transition temperature range followed by cooling. Biaxially oriented films or sheets can have a maximum shrink tension in one direction.

The heat-shrinkable films of the sterilization sensors of the present disclosure reach a temperature at or above that which the shrink tension of the heat-shrinkable polymer is sufficiently high to cause a substantial change in one or more dimensions of the sheet. The process of making and orienting heat-shrinkable polymer sheets is well known to those having ordinary skill in the art.

In certain embodiments, the sterilization sensors of the present disclosure include a heat-shrinkable film with an area having a strained temporary shape, and includes at least one of a plurality of perforations having a width therein and a total length. When heated to or above a transition temperature range, the heat-shrinkable polymer sheet at least partially converts from its strained temporary shape to its intrinsic shape. The intrinsic shape of the heat-shrinkable film is the shape to which it returns after the polymer is heated to or above a transition temperature range.

In certain embodiments, it is possible to anneal some heat-shrinkable polymers by heating them to a temperature close to but below the transition temperature range. Depending upon the composition of the polymer, such annealing can cause the temporary shape of the heat-shrinkable polymer to change and substantially eliminate the potential for small changes in shape at temperatures below the shape memory transition temperature range.

Examples of commercially available thermoplastic films include: polyurethanes available under the trade designation DIARY, including the MM, MP, MS, and MB (microbead powder) types series available from SMP Technologies, Inc. of Tokyo, Japan; elastic memory composites available under the trade designation EMC from Composite Technology Development, Inc. of Lafayette, CO; and polymers available under the trade designation VERIFLEX from Cornerstone Research Group, Inc. of Dayton, OH. The shape memory properties of acrylonitrile-butadiene-styrene (ABS) copolymers, polycarbonate, and polyethylene terephthalate are also disclosed by Hussein et al., in "New Technologies for Active Disassembly: Using the Shape Memory Effect in Engineering Polymers, *J. Product Development*, 6, 431-449 (2008).

Additional examples of commercially available heat-shrinkable films that can be converted into various shapes include those heat-shrinkable films available under the trade designations CORTUFF, CRYOVAC, and OPTI from Sealed Air Inc. of Elmwood Park, NJ Additional examples include heat-shrinkable films available under the trade designations SHRINKBOX, VHG, EZ, AFG, ABL and PLAnet from Bemis Clysar of Oshkosh, WI.

Optional Adhesive

In certain embodiments, the reactant-functional porous sorbent is adhered to the thermal indicator component using a layer of an adhesive. The layer of adhesive may be continuous or discontinuous. It may be laminated to the thermal indicator component or coated thereon (e.g., pattern coated). It may be a double-sided transfer adhesive, a sprayable adhesive, or a hot-melt adhesive.

Exemplary adhesives include those described, for example, in U.S. Pat. No. 7,893,179 (Anderson et al.) and U.S. Pat. No. 9,134,251 (Thomas et al.). For example, the adhesive may include a natural rubber adhesive, a synthetic rubber adhesive, a poly-alpha-olefin adhesive, a styrene block copolymer adhesive, a poly(meth)acrylate adhesive, a silicone adhesive, or mixtures thereof.

The layer of adhesive can function as a buffer or insulator. Thus, the thickness of the adhesive can be tailored to control the extent of thermal response. A typical adhesive layer thickness is at least 1 micron, or at least 25 microns, and often up to 2500 microns, or up to 200 microns.

Exemplary Hydrogen Peroxide Sterilization Sensors

The hydrogen peroxide sterilization sensors can be incorporated into formats of known hydrogen peroxide sterilization sensors. In addition, other known sterilization sensors can be adapted by one of skill in the art, including, for example, U.S. Pat. No. 5,451,372 (Larsson et al.), U.S. Des 315,600 (Niven), and RE 34,515 (Foley). Sensors of the present disclosure can be in a variety of shapes and sizes. Typical sensors include a smallest dimension of at least 2.5 centimeters, to avoid getting lost in a sterilizer.

FIGS. 1-11 are representative hydrogen peroxide sterilization sensors.

Figure 1B:
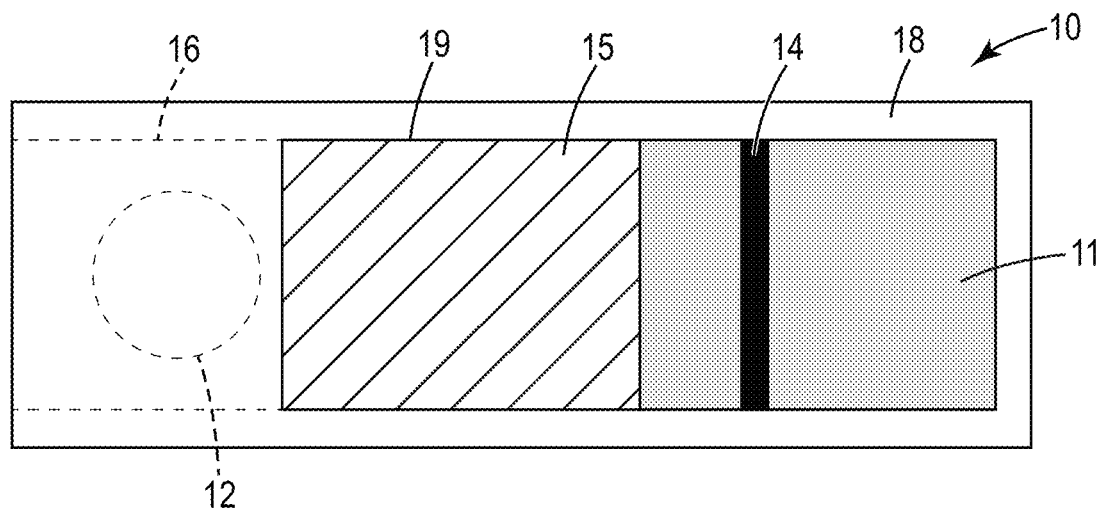
Figure 2:
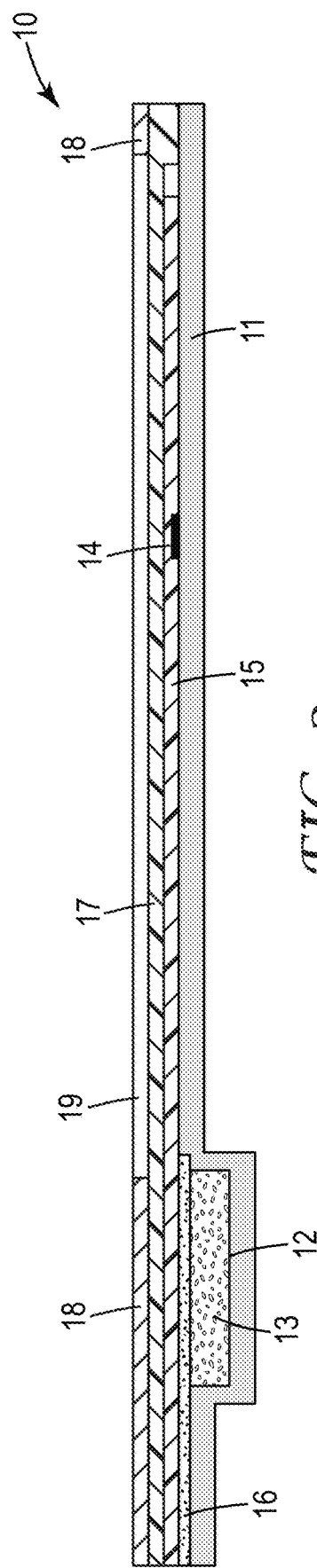
FIG. 2 is a cross-section of the hydrogen peroxide sterilization sensor of FIG. 1a, along lines 2-2.

FIG. 1 is a top view of one embodiment of a hydrogen peroxide sterilization sensor of the present disclosure, wherein FIG. 1*a* represents the sensor before activation by hydrogen peroxide and FIG. 1*b* represents the hydrogen peroxide sterilization sensor after activation by hydrogen peroxide. FIG. 2 is a cross-section of the hydrogen peroxide sterilization sensor of FIG. 1.

Referring to FIGS. 1*a*, 1*b*, and 2, the hydrogen peroxide sterilization sensor 10 includes a backing substrate 11 (not shown in FIG. 1*a*) that includes a reservoir 12 (represented by a dashed line in the form of a circle in FIGS. 1*a* and 1*b*) for holding the reactant-functional porous sorbent 13 (not shown in FIG. 1*a* or 1*b*). Disposed on the backing substrate 11 is visual indicator 14 (e.g., an image such as a picture or word, or a colored feature), such as the black line shown in FIG. 1*b*. Disposed on the backing substrate 11 (and the visual indicator 14) is a heat-shrinkable film 15, which is adhered to the backing substrate 11 at one end using an adhesive 16 (region of adhesive is represented by a dashed line in the form of a rectangle in FIGS. 1*a* and 1*b*). The adhesive 16 locks the heat-shrinkable film 15 in place at one end of the sensor, which causes any shrinkage to move toward the immobilized end in a generally linear fashion. The adhesive 16 also provides thermal contact between the reactant-functional porous sorbent 13 and the heat-shrinkable film 15. The hydrogen peroxide sterilization sensor 10 may also include a transparent film 17 (e.g., thermoplastic film not shown in FIGS. 1a and 1b) disposed on the heat-shrinkable film 15, although this is optional. The topmost layer is a cover film 18 (e.g., paper, thermoplastic film) that includes a window 19, through which the heat-shrinkable film 15 is visible. This window 19 may simply be a cut-out creating an opening in the cover film 18.

FIG. 1a shows the heat-shrinkable film 15 prior to detection of the presence of hydrogen peroxide, which involves an exothermic interaction between hydrogen peroxide and the reactant in the reactant-functional porous sorbent. The heat generated from the interaction causes a dimensional change in the heat-shrinkable film 15. The resultant dimensional change (i.e., shrinkage) of the heat-shrinkable film 15 reveals the visual indicator (e.g., a black line) 14 after detection of the hydrogen peroxide, which is demonstrated by FIG. 1b.

Figure 3A:
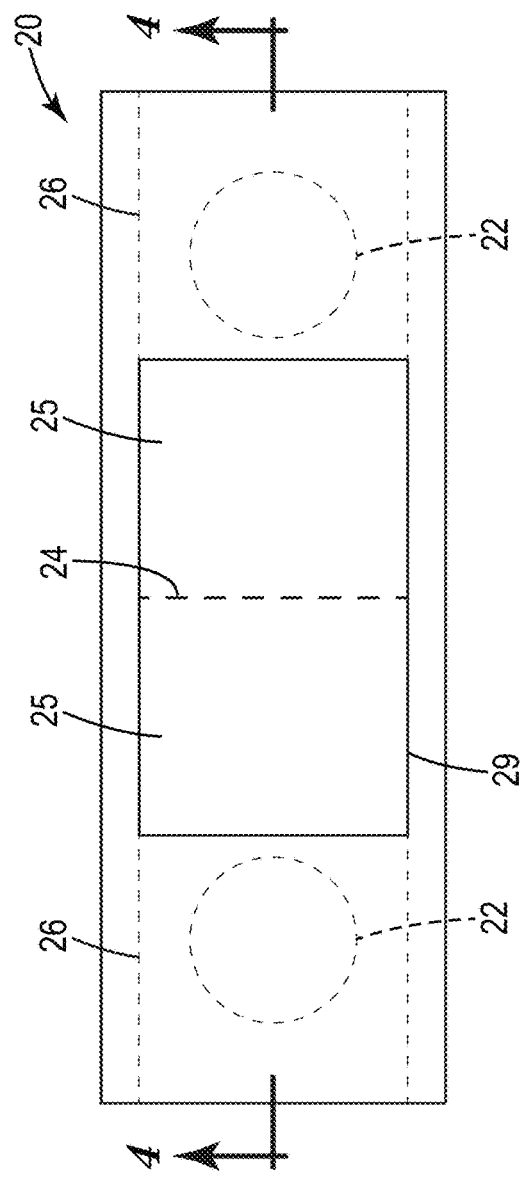
FIG. 3a represents the sterilization sensor before activation by hydrogen peroxide and FIG. 3b represents the sterilization sensor after activation by hydrogen peroxide.
Figure 3B:
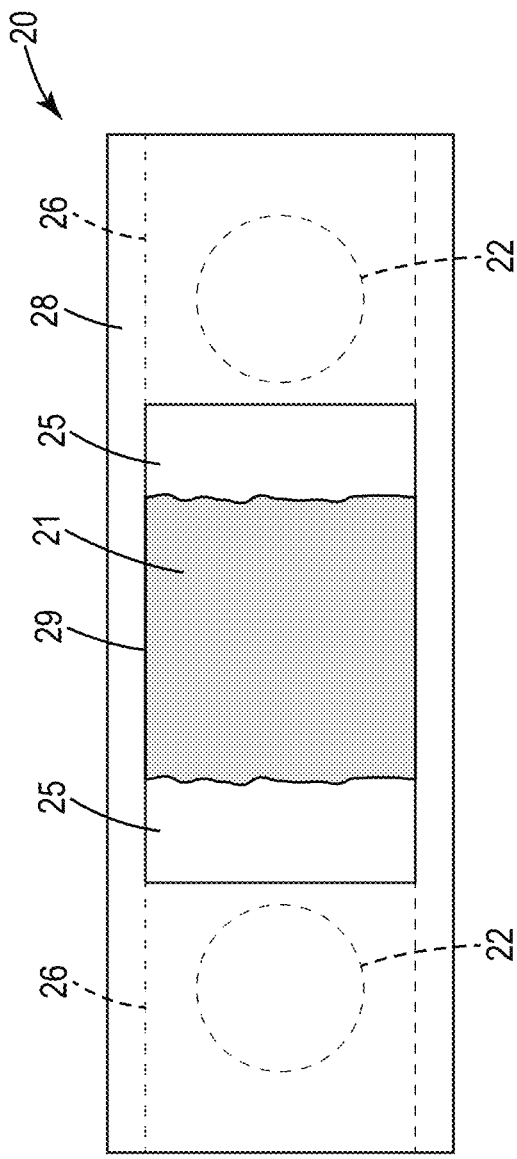
Figure 4:
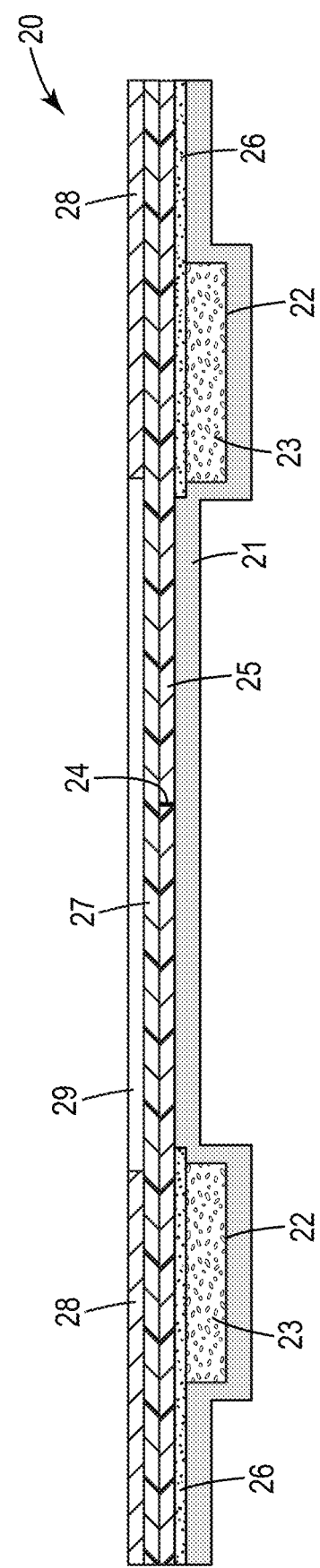
FIG. 4 is a cross-section of the hydrogen peroxide sterilization sensor of FIG. 3a, along lines 4-4.

Referring to FIGS. 3a, 3b, and 4, the hydrogen peroxide sterilization sensor 20 includes a backing substrate 21 (not shown in FIG. 3a) that includes two reservoirs 22 (each represented by a dashed line in the form of a circle in FIGS. 3a and 3b) for holding the reactant-functional porous sorbent 23 (not shown in FIG. 3a or 3b). Disposed on the backing substrate 21 is a heat-shrinkable film 25 that includes a perforated line 24. The heat-shrinkable film 25 is adhered to the backing substrate 21 at both ends using an adhesive 26 (each region of adhesive represented by a dashed line in the form of a rectangle in FIGS. 3a and 3b). The adhesive 26 locks the heat-shrinkable film 25 in place at both ends of the sensor, which causes any shrinkage to move toward the immobilized ends in a generally linear fashion. The adhesive 26 also provides thermal contact between the reactant-functional porous sorbent 23 and the heat-shrinkable film 25. The hydrogen peroxide sterilization sensor 20 may also include a transparent film 27 (e.g., thermoplastic film not shown in FIGS. 3a and 3b) disposed on the heat-shrinkable film 25, although this is optional. The topmost layer is a cover film 28 (e.g., paper, thermoplastic film) that includes a window 29, through which the heat-shrinkable film 25 is visible. This window 29 may simply be a cut-out creating an opening in the cover film 28. Optionally, any hydrogen peroxide sterilization sensor according to the present disclosure may also include a transparent film (e.g., thermoplastic film) disposed on an element that does not generate a significant amount of heat (e.g., a heat-shrinkable film), although this is optional.

FIG. 3a shows the heat-shrinkable film 25 prior to exposure to hydrogen peroxide, which involves an exothermic interaction between hydrogen peroxide and the reactant in the reactant-functional porous sorbent. The heat generated from the interaction causes a dimensional change in the heat-shrinkable film 25. The resultant dimensional change (i.e., shrinkage) of the heat-shrinkable film 25 causes the perforated line 24 to completely perforate and the heat-shrinkable film 25 to separate into two pieces and reveal the backing substrate 21 (which would typically be in a different color for easy visualization) after exposure to hydrogen peroxide. This is demonstrated by FIG. 3b. The degree of shrinkage and separation between the two pieces of the heat-shrinkable film 25 will depend on the amount of heat to which it is exposed, which will depend on the amount of hydrogen peroxide to which the reactant-functional porous sorbent is exposed.

Figure 5:
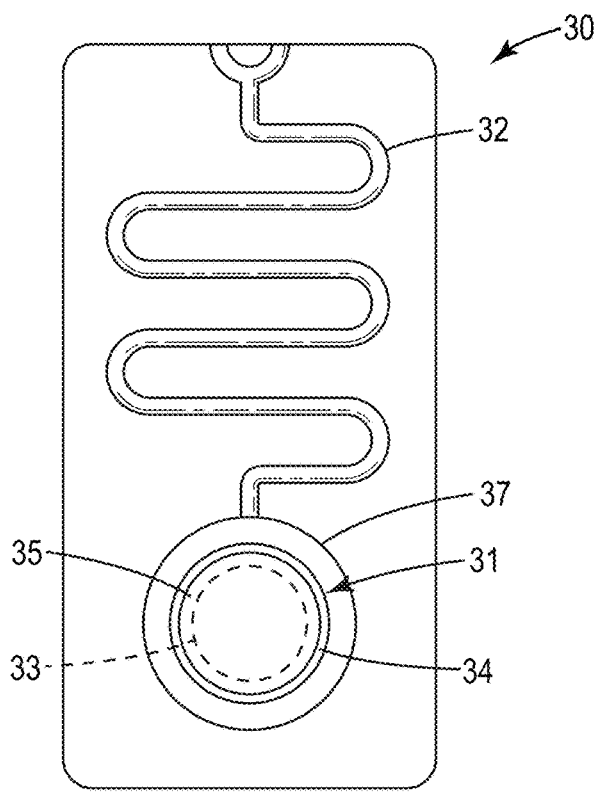
FIG. 5 is a schematic top view of a physical pack holding another embodiment of a hydrogen peroxide sterilization sensor of the present disclosure.
Figure 6A:
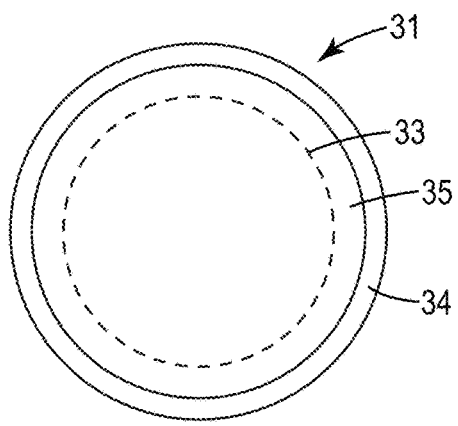
FIG. 6a represents a top view and FIG. 6b a cross-sectional view.
Figure 7A:
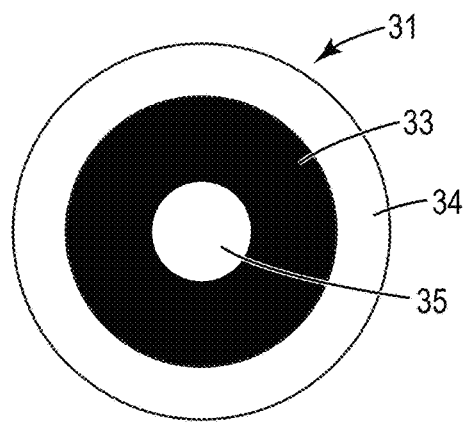
FIG. 7a represents a top view and FIG. 7b a cross-sectional view.
Figure 6B:
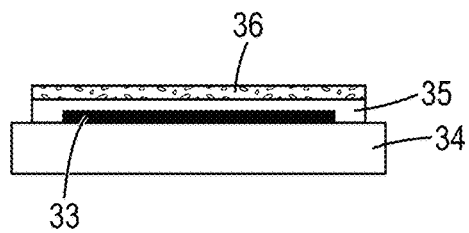
Figure 7B:
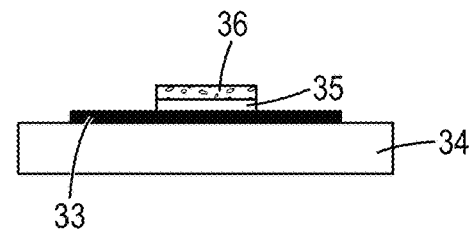

FIG. 5 is a top view of a physical pack holding another embodiment of a hydrogen peroxide sterilization sensor of the present disclosure. The physical pack could include any hydrogen peroxide sterilization sensor described herein. FIG. 6 is a representation of the hydrogen peroxide sterilization sensor of FIG. 5 before activation by hydrogen peroxide, wherein FIG. 6a represents a top view and FIG. 6b a cross-sectional view. FIG. 7 is a representation of the hydrogen peroxide sterilization sensor of FIG. 5 after activation by hydrogen peroxide, wherein FIG. 7a represents a top view and FIG. 7b a cross-sectional view.

Referring to FIGS. 5, 6a, 6b, 7a, and 7b, the physical pack 30 includes a hydrogen peroxide sterilization sensor 31. The physical pack 30 includes a molded backing (e.g., a thermoplastic backing) that includes a tortuous channel 32 and a reservoir 33, in which is placed the hydrogen peroxide sterilization sensor 31. An (optional) transparent film (e.g., transparent thermoplastic layer) is adhered to the molded backing to allow visualization of the change in the hydrogen peroxide sterilization sensor 31 upon exposure to hydrogen peroxide. The tortuous channel 32 provides a passage through which the hydrogen peroxide diffuses through the physical pack 31 into the reservoir 33 where it contacts the hydrogen peroxide sterilization sensor 31. In this embodiment, the hydrogen peroxide sterilization sensor 31 includes a backing substrate 34 on which is disposed a visual indicator 33 (e.g., an image such as a picture or word, or a colored feature), such as the black circle, which represented by the dashed line in FIGS. 5 and 6a and the black circle in FIG. 7a. Covering the visual indicator 33 and disposed on the backing substrate 34 is a heat-shrinkable film 35 that includes reactant-functional porous sorbent 36 disposed thereon (and/or incorporated therein). The heat-shrinkable film 35, which is in the form of a circle, is adhered to the backing substrate 34 at the center of the heat-shrinkable film 35. FIGS. 6a and 6b show the heat-shrinkable film 35 prior to exposure to hydrogen peroxide. The heat generated from the interaction causes a dimensional change in the heat-shrinkable film 35, which forms a smaller circle and reveals the visual indicator 33 after exposure to hydrogen peroxide. The resultant heat-shrinkable film 35 forms a smaller circle (i.e., a donut hole) as shown FIGS. 7a and 7b. While the hydrogen peroxide sterilization sensor 31 is shown to be circular in this embodiment, any shape could be envisioned. Such a physical pack 30, which modifies the gas or vapor's accessibility to the sensor over time, could be made using sensor components other than a heat-shrinkable film; e.g., the hydrogen peroxide sensor 31 could include an electronic thermal sensor or irreversible temperature indicator in place of the heat-shrinkable film 35.

Figure 8A:
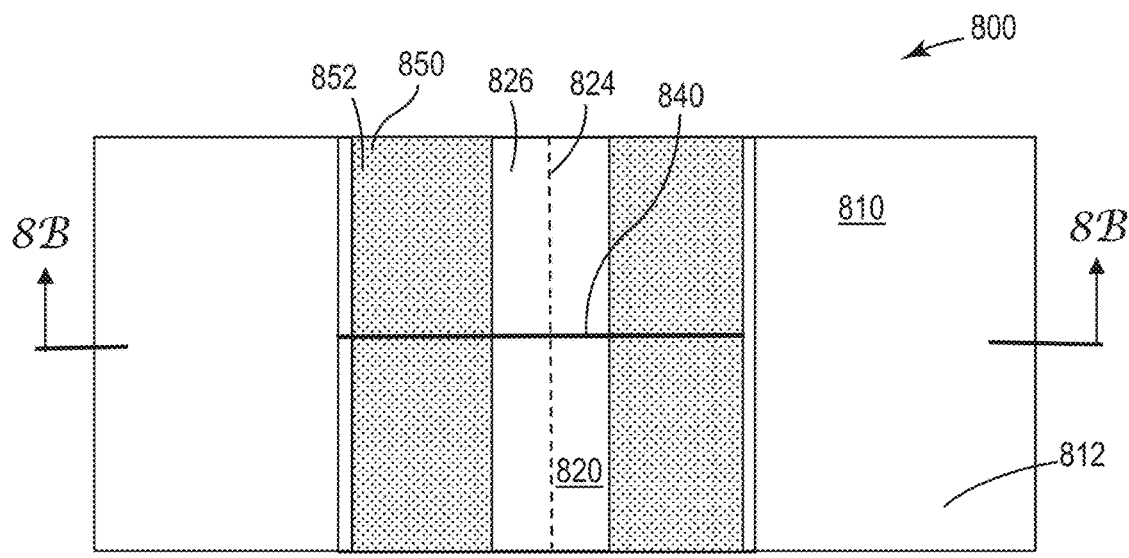
FIG. 8a is a schematic top view of an exemplary hydrogen peroxide sterilization sensor according to the present disclosure.
Figure 8B:
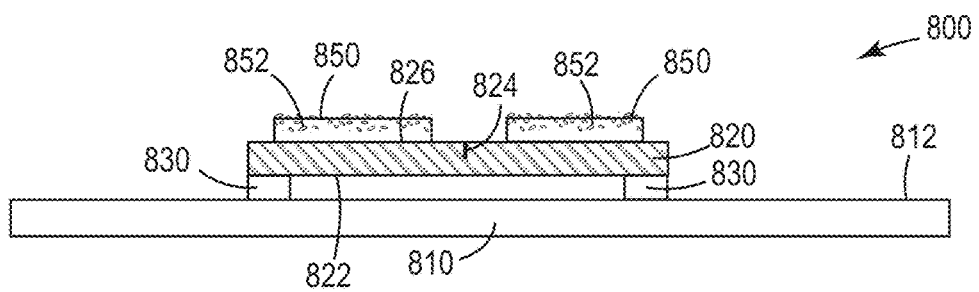
FIG. 8b is a cross-section of the hydrogen peroxide sterilization sensor of FIG. 8a, along lines 8b-8b.

FIG. 8a is a schematic top view of an exemplary hydrogen peroxide sterilization sensor 800 according to the present disclosure, before activation by hydrogen peroxide. FIG. 8b is a cross-section of the hydrogen peroxide sterilization sensor 800 of FIG. 8a, along lines 8b-8b. Referring to FIGS. 8a and 8b, a hydrogen peroxide sterilization sensor 800 includes a substrate 810 having a major surface 812. A heat-shrinkable film 820 is attached to the major surface 812 of the substrate by an adhesive 830 (not visible in FIG. 8a). In this case, two spaced strips of adhesive 830 are provided, each attached to a first major surface 822 (not visible in FIG. 8a) of the heat-shrinkable film 820 and extending approximately parallel to an opposing edge of the heat-shrinkable film 820. A space is defined between the two lines of adhesive 830 in which the heat-shrinkable film 820 is not adhered to the substrate 810 and the adhesive 830 locks the heat-shrinkable film 820 in place at both ends of the sensor 800, which causes any shrinkage to move toward the immobilized ends in a generally linear fashion. Further, a perforated line 824 is provided down the center of the heat-shrinkable film 820 to provide a point of weakness within the heat-shrinkable film 820. The hydrogen peroxide sterilization sensor 800 also includes a line of a conductive ink 840 (not visible in FIG. 8b) as a thermal indicator component, which is disposed on a second major surface 826 of the heat-shrinkable film 820 orthogonal to the perforated line 824. Additionally, the hydrogen peroxide sterilization sensor 800 includes two spaced strips of adhesive 850 which a reactant-functional sorbent 852 is disposed thereon and/or incorporated therein. The adhesive 850 provides thermal contact between the particles of reactant-functional sorbent 852 and the heat-shrinkable film 820. Each strip of adhesive 850 is disposed on the second major surface 826 of the heat-shrinkable film 820 and extending approximately parallel to an opposing edge of the heat-shrinkable film 820.

Figure 8C:
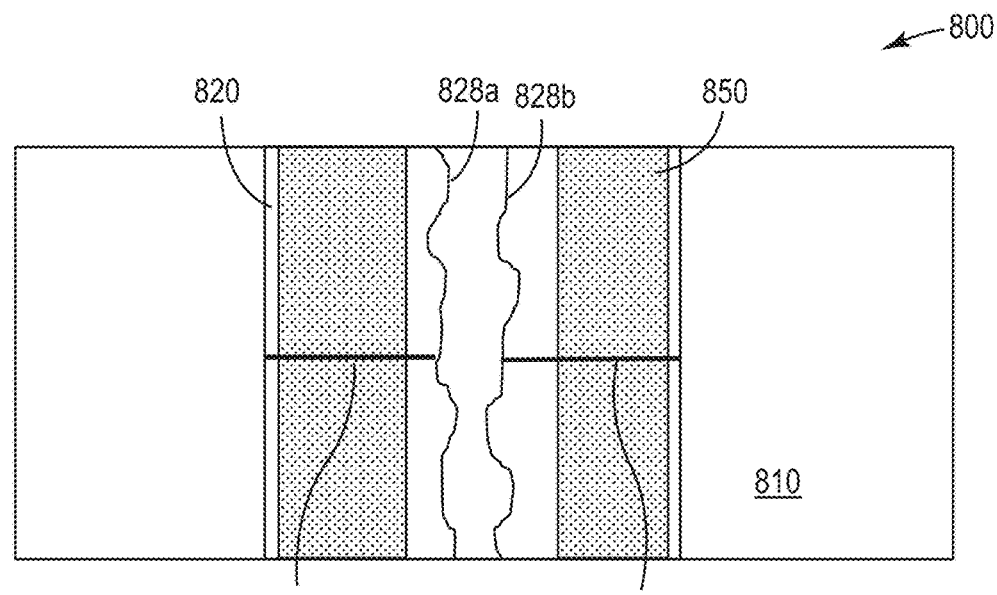
FIG. 8c is a schematic top view of the hydrogen peroxide sterilization sensor of FIG. 8a after activation by hydrogen peroxide.

In operation, the hydrogen peroxide sterilization sensor 800 is exposed to hydrogen peroxide, and once the reactant of the reactant-functional sorbent 852 reacts with a sufficient amount of hydrogen peroxide, the exothermic interaction generates sufficient heat to cause a dimensional change (i.e., shrinkage) in the heat-shrinkable film 820. FIG. 8c is a schematic top view of the hydrogen peroxide sterilization sensor 800 of FIG. 8a after activation by hydrogen peroxide. More particularly, the hydrogen peroxide sterilization sensor 800 of FIG. 8c shows that sufficient dimensional change (i.e., shrinking) of the heat-shrinkable film 820 results in failure of the heat-shrinkable film 820 at the perforated line 824, splitting the heat-shrinkable film 820 into separate pieces, each having an edge 828a and 828b spaced apart from each other and revealing the backing substrate 810 (which optionally can have a different color than the heat-shrinkable film 820 in at least its center region for easy visualization) after exposure to at least a minimum amount of hydrogen peroxide. The separation of the heat-shrinkable film 820 into two pieces also separates the line of conductive ink 840 into two partial lines of conductive ink 840a and 840b. The degree of shrinkage and separation between the two pieces of the heat-shrinkable film 820 will depend on the amount of heat to which it is exposed, which is, in part, a function of how much hydrogen peroxide to which the sensor has been exposed. The hydrogen peroxide sterilization sensor 800 of this embodiment includes the options of both a visible detectable result with the breakage of the heat-shrinkable film 820 into two pieces and an electronic detectable result with the breakage of the line of conductive ink 840 that destroys an electronic circuit that could be connected to the line of conductive ink 840.

Figure 9:
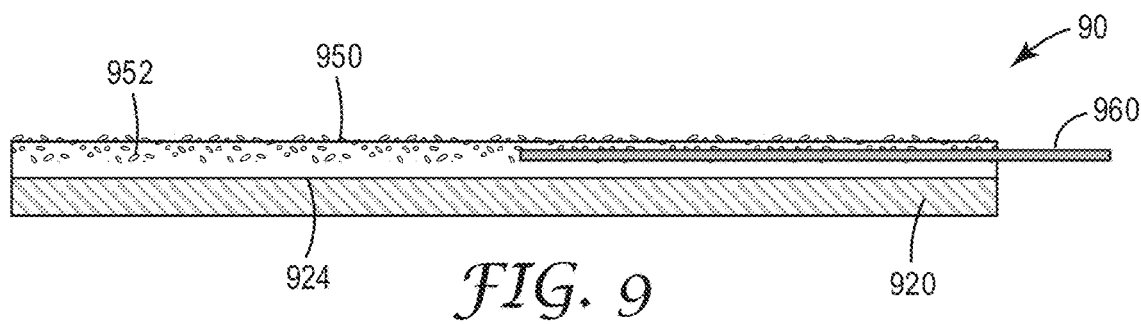
FIG. 9 is a schematic cross-sectional view of another exemplary hydrogen peroxide sterilization sensor according to the present disclosure.

Referring to FIG. 9, a schematic cross-sectional view is provided of another exemplary hydrogen peroxide sterilization sensor 90 according to the present disclosure. The hydrogen peroxide sterilization sensor 90 includes a substrate 920 having a major surface 924. The substrate 920 is not particularly limited, and may be or comprise, for instance, plastic film, glass, thin aluminum film, molded plastic sheet, paper, foil, etc. For sensors that will be applied to a surface that is not flat, a conformable substrate material is preferable. An adhesive 950 is disposed on at least a portion of the major surface 924 of the substrate 920, the adhesive 950 having particles of a reactant-functional sorbent 952 embedded within at least an upper portion of the adhesive 950. The hydrogen peroxide sterilization sensor 90 further includes a thermocouple 960 as a thermal indicator component, which is partially embedded in the adhesive 950. Optionally, a second substrate (not shown) could be used with the ammonia sensor 90. For instance, a major surface of the substrate 920 (that is opposite the major surface 924) could be adhered to a second substrate, (e.g., glass, a thin aluminum film, molded plastic sheet, paper, foil, etc.).

In operation, the hydrogen peroxide sterilization sensor 90 is exposed to hydrogen peroxide, and once the reactant of the reactant-functional sorbent 952 reacts with a sufficient amount of hydrogen peroxide, the exothermic interaction generates sufficient heat to cause a detectable response from the thermocouple 960. The skilled practitioner will understand that the thermocouple needs to be attached to some type of electronics to obtain and display temperature measurements from the thermocouple (such as a data acquisition system from Keysight Technologies, Colorado Springs, CO).

Figure 10:
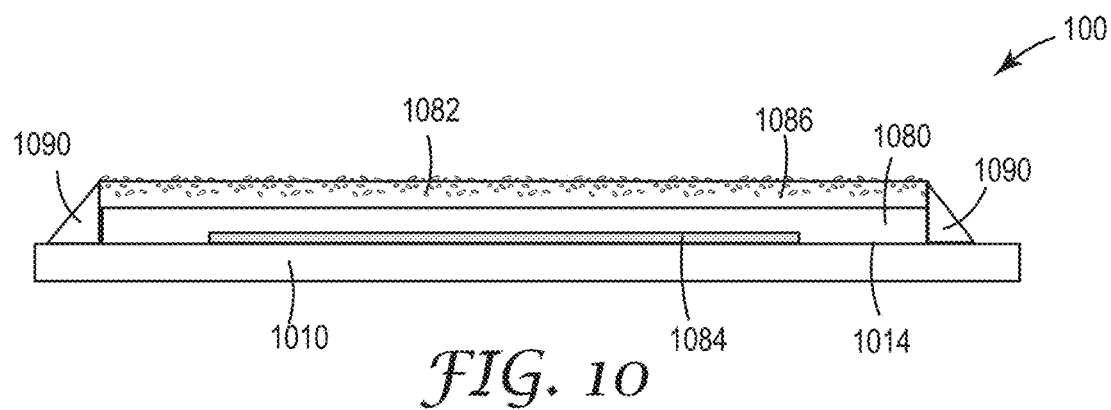
FIG. 10 is a schematic cross-sectional view of an additional exemplary hydrogen peroxide sterilization sensor according to the present disclosure.

Referring to FIG. 10, a schematic cross-sectional view is provided of an additional exemplary hydrogen peroxide sterilization sensor 100 according to the present disclosure. The hydrogen peroxide sterilization sensor includes a substrate 1010 having a major surface 1014. An irreversible temperature indicator 1080 is disposed on a major surface 1014 of the substrate 1010. In this embodiment, the irreversible temperature indicator 1080 is adhered to the major surface 1014 of the substrate 1010 using adhesive tape 1090, on opposing side edges of the irreversible temperature indicator 1080. The irreversible temperature indicator 1080 includes a display region 1084 where a change in temperature can be observed, and the display region 1084 faces the substrate 1010. Preferably, a material is chosen for the substrate 1010 that can be seen through by a user, such as glass or a transparent plastic, although the irreversible temperature indicator 1080 could be removed from the substrate for observation of any temperature change. The irreversible temperature indicator 1080 further includes an adhesive backing 1082 having particles of a reactant-functional sorbent 1086 disposed thereon and/or incorporated therein. Optionally, additional adhesive (not shown) may be required to attach the irreversible temperature indicator to an object in the sterilizer chamber.

In operation, the hydrogen peroxide sterilization sensor 100 is exposed to hydrogen peroxide, and once the reactant of the reactant-functional sorbent 1086 reacts with a sufficient amount of hydrogen peroxide, the exothermic interaction generates sufficient heat to cause a detectable response in the irreversible temperature indicator 1080. In some cases, the display region 1084 of the irreversible temperature indicator 1080 comprises a series of areas (e.g., squares, circles, etc.), each labeled with a temperature, and as the heat rises, the areas representing increasingly higher temperatures show a response (e.g., changing from blank (such as white) to filled (such as black).

Figure 11:
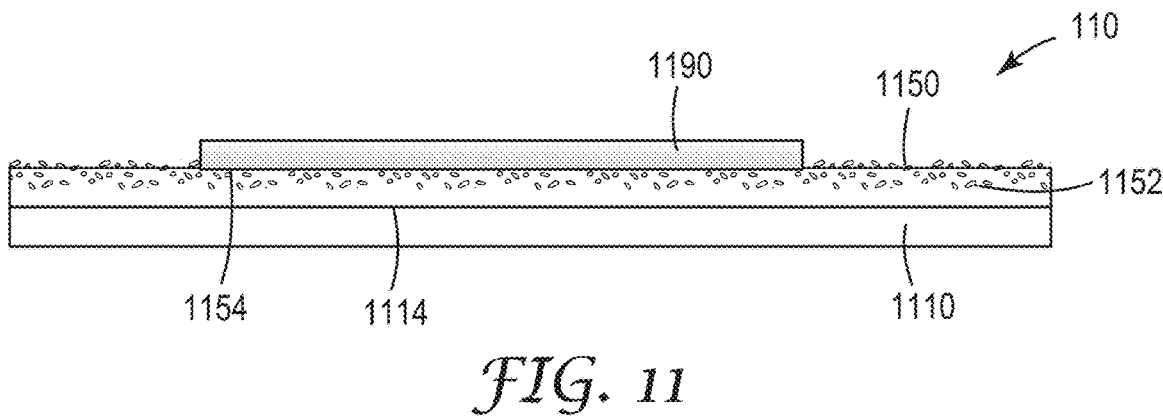
FIG. 11 is a schematic cross-section view of a further exemplary hydrogen peroxide sterilization sensor according to the present disclosure.

Referring to FIG. 11, a schematic cross-sectional view is provided of a further exemplary hydrogen peroxide sterilization sensor 110 according to the present disclosure. The hydrogen peroxide sterilization sensor 110 includes a substrate 1110 having a major surface 1114. An adhesive 1150 is disposed on at least a portion of the major surface 1114 of the substrate 1110, the adhesive 1150 having particles of a reactant-functional sorbent 1152 disposed thereon and/or incorporated therein. The hydrogen peroxide sterilization sensor 110 further includes an RFID tag 1190 as a thermal indicator component, which is in thermal contact with (e.g., disposed on) a major surface 1154 of the adhesive 1150. In operation, the hydrogen peroxide sterilization sensor 110 is exposed to hydrogen peroxide, and once the reactant of the reactant-functional sorbent 1152 reacts with a sufficient amount of hydrogen peroxide, the exothermic interaction generates sufficient heat to damage the electronic circuitry of the RFID tag 1190. When an RFID reader no longer receives a signal from the RFID tag 1190 or provides an altered response to the RF reader in response to heat to provide a detectable response, the hydrogen peroxide sterilization sensor 110 has indicated that conditions for hydrogen peroxide sterilization have been met.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise stated, all amounts are in weight percent.

TABLE 1

List of Materials and Suppliers

| DESIGNATION | DESCRIPTION | SOURCE |
|---|---|---|
| CER-1 | Cationic exchange resin obtained under the trade designation "AMBERLYST" 15H (>50 mesh/>300 micrometers (μm)) | Alfa Aesar, Haverhill, MA |
| NaOH | Sodium Hydroxide (1.0N aqueous solution) | EMD Millipore Chemicals, Billerica, MA |
| DVB | Divinylbenzene (80% tech grade), which contained 80 weight percent DVB and 20 weight percent styrene-type monomers. The calculation of moles of DVB used to prepare the polymeric material does take into account the purity. | Sigma-Aldrich, St. Louis, MO |
| MA | Maleic Anhydride | Alfa Aesar |
| VAZO 52 | 2,2'-Azobis(2-Methylpropionitrile) obtained under the trade designation "VAZO 52" | DuPont, Wilmington, DE |
| EtOAc | Ethyl Acetate | EMD Millipore Chemicals |
| KOH | Potassium Hydroxide | Avantor, Radnor, PA |
| KI | Potassium Iodide | EMD Millipore Chemicals, |
| Activated Carbon | Activated Carbon (Kuraray GW-H, 32 × 60 mesh) | Calgon Carbon Corp., Moon Township, PA |
| Silica Gel 60 | Silica Gel 60 (average pore size = 60 Å) | Sigma-Aldrich |
| Glass slide | Glass micro slide (2 inches × 3 inches; 5.1 centimeters (cm) × 7.6 cm) | Erie Scientific, Ramsey, MN |
| Transfer adhesive | 5 mil (0.13 millimeters (mm)) 200 MP transfer adhesive, 2 inches (5.1 cm) wide | 3M Company, St. Paul, MN, USA |
| Heat-shrink film | Polyethylene heat-shrink film obtained under the trade designation "CYLSAR SHRINKBOX 1525" | Bemis Company, Neenah, WI, USA |
| Double coated tape | 6 mil (0.15 mm) 410M double coated tape | 3M Company |
| Polyester tape | 3M polyester tape 8403 | 3M Company |
| Silver ink | Silver nanoparticle dispersion (50-60 wt. %) in tetradecane obtained under the trade designation "SILVERJET DGH 55LT-25C" | Advanced Nano Products Co., Etd., Sejong, South Korea |

Test Methods

Procedure for Exposing Sensors to Vaporized Hydrogen Peroxide

A STERRAD 100s sterilizer manufactured by Advanced Sterilization Products (Irvine, CA) was used to expose all sensor samples to a complete Normal 100s cycle to determine their response. The 100s Normal cycle used in this experiment, consisted of two half cycles with vaporized hydrogen peroxide (VHP) injections of 6 minutes at a chamber pressure of 7.2 to 7.3 ton and at a chamber temperature of 50° C. The calculated (theoretical) cumulative VHP exposure for the complete cycle is approximately 4,000 mg VHP-sec/L.

EXAMPLES

Preparative Example 1 (PE-1)

Preparation of Cation Exchange Resin Sodium Form

The following procedure was used to prepare the sodium salt form of "AMBERLYST" 15H (CER-1). To a 2 liter (L) Erlenmeyer flask containing 500 milliliters (mL) of 1 N aq. sodium hydroxide (NaOH) was added 50.05 grams (g) of CER-1. The solids were allowed to stand in the basic solution for 30 minutes. The solids were then isolated by vacuum filtration. The solids were washed with water until the pH of the filtrate was neutral. The solids were placed in a batch oven and dried overnight at 100° C.

Preparative Example 2 (PE-2)

Preparation of Hydrolyzed DVB/MA Copolymer Potassium Form

In a 2 L Parr stainless steel pressure vessel, 177.11 grams (1.36 moles) divinylbenzene (DVB) (80 wt. %, tech grade), 240.05 grams (2.45 moles) of maleic anhydride (MA), and 4.17 grams (16.8 mmoles) of 2,2'-azobis(2-methylpropionitrile) (VAZO 52) were dissolved in 625.92 grams of ethyl acetate (EtOAc). The polymerizable composition had 40.0 wt. % solids in EtOAc and contained a monomer mixture (34.0 wt. % DVB, 57.5 wt. % MA, and 8.5 wt. % styrene-type monomers) and 1 wt. % VAZO 52 (based on total weight of monomers). The polymerizable composition was bubbled with nitrogen for 15 minutes. The pressure vessel was then sealed and placed in a water bath at 60° C. The polymerizable composition was heated at this elevated temperature for 18 hours. A white precipitate that had formed was isolated by vacuum filtration and washed with EtOAc. The solid was placed in a 4 L Erlenmeyer flask and 2.0 L of EtOAc was added to the flask. The solid was allowed to stand in EtOAc for one hour at room temperature. The solid was again isolated by vacuum filtration and washed with EtOAc. The solid was placed in a 4 L Erlenmeyer flask and 2.0 L of EtOAc was added. The solid was allowed to stand in EtOAc overnight. The solid was again isolated by vacuum filtration and washed with EtOAc. The solid was dried in a batch oven at 100° C. for 18 hours. After drying, the solid was ground down to small particles using a model MF10.1 rotary hammer mill by IKA-Werke (Staufen, Germany). The small particles of this porous sorbent were screened to 20×40 mesh particles using a Meinzer II vibratory sieve shaker.

The porous sorbent, detailed in the previous section, was treated with a hydrolyzing agent (aqueous potassium hydroxide (KOH)). More specifically, 9.85 g (176 mmol) of KOH was dissolved in 175 mL of deionized water within an 8 ounce jar. To this solution was added 30.0 g of the porous sorbent. The jar was capped and placed on a jar roller and allowed to roll at a moderate rate for 16 hours at room temperature. The solid polymer was isolated out of solution using vacuum filtration with a Buchner funnel and washed with deionized water. The solid was transferred back into the 8 oz jar, and the jar was filled with deionized water. The jar was returned back to the jar roller and allowed to roll at a moderate rate for 16 hours at room temperature. After rolling, the solid polymer was isolated out of the water by vacuum filtration using a Buchner funnel and washed with deionized water. The solid was returned back to the jar, and the jar was filled with deionized water. The jar was placed on a jar roller and allowed to roll at a moderate rate for 4 hours at room temperature. The solid was isolated out of the water by vacuum filtration using a Buchner funnel and washed with deionized water. The solid was then transferred to a glass pan and dried in a batch oven at 100° C. for 16 hours.

Preparative Examples 3-10 (PE-3 to 10)

Preparation of Potassium Iodide Impregnated Sorbents

Eight different potassium iodide (KI) impregnated sorbents (PE-3 to PE-10) were prepared using the following procedure. Aqueous KI solutions with concentrations of 2.9 or 9.1 wt. % were prepared by dissolving either 3.0 g or 10.0 g of KI in 100 mL of deionized water, respectively. The KI impregnated sorbents PE-3 to PE-10 were prepared by adding 10.0 g of a porous sorbent to an 8 ounce jar containing 100 mL of either a 2.9 or 9.1 wt. % KI solution. The solids of the porous sorbent were soaked in each solution by placing each jar on a jar roller. The jars were rolled for 16 hours at room temperature. The solids were then isolated out of each solution by vacuum filtration using a Buchner funnel and a minimal amount of deionized water. The solids of each of the KI impregnated sorbents (PE-3 to 10) were dried in an oven at 100° C. for 16 hours. The KI solution concentration and porous sorbent used to prepare each KI impregnated sorbent is summarized in Table 2.

TABLE 2

Preparation details for the KI impregnated sorbents (PE-3 to 10).

| Sorbent | Porous Sorbent | Impregnant Solution Concentration, wt. % |
|---|---|---|
| PE-3 | PE-1 | 2.9 |
| PE-4 | PE-1 | 9.1 |
| PE-5 | Silica Gel 60 | 2.9 |
| PE-6 | Silica Gel 60 | 9.1 |
| PE-7 | Activated Carbon | 2.9 |
| PE-8 | Activated Carbon | 9.1 |
| PE-9 | PE-2 | 2.9 |
| PE-10 | PE-2 | 9.1 |

Examples 1-8 (EX-1 to 8)

Preparation of Heat-Shrink Film Based Sensors

A 2 inch (5.1 centimeters (cm)) wide strip of 200MP transfer adhesive, with the liner still on one side, was laminated onto "CLYSAR" Shrinkbox heat-shrink film. A roller was passed over the transfer adhesive several times to ensure complete contact with the heat-shrink film. The laminated material was then cut into a 1.5 inch×1.5 inch (3.8 cm×3.8 cm) square. In one of the corners of the laminated materials, a 1 cm square piece of 410M double coated tape (liner still on one side) was laminated to the heat-shrink film side. A roller was passed over the materials again to ensure proper lamination. The liner was removed from the 1 cm square piece of double coated tape and then the stack was laminated into the center of the 2 inch×3 inch (5.1 cm×7.6 cm) glass slide, with the 200MP lined transfer adhesive being the top layer. A roller was again passed over the sample to ensure proper lamination of all the layers. A permanent marker was then used to outline the original dimensions of the stack and was used as a reference to measure the degree of shrinkage after VHP exposure.

The liner on the 200MP transfer adhesive was then removed to expose the adhesive and allow the sorbent to be bonded to the stack. The sorbent was added by pouring it over the exposed adhesive. To ensure good adhesion of the sorbent, a piece of computer paper was placed over the entire sample, and a rubber roller was used to lightly press the sorbent into the adhesive so as to take care to not crush the sorbent particles or break the glass slide. The glass slide was then tipped on its side and lightly tapped to remove any loose sorbent.

Each indicator was exposed to VHP as described in the Procedure for Exposing Sensors to Vaporized Hydrogen Peroxide. The sorbent used to prepare each heat-shrink film based sensor sample, the sorbent loading, the measured shrinkage in the x and y direction and the calculated total area shrinkage for EX-1 to 8 are summarized in Table 3.

TABLE 3

Details of indicator samples EX-1 to 8 and response to VHP exposure.

| Example | Sorbent | Sorbent Loading, gsm* | X-Axis Shrinkage, % | Y-Axis Shrinkage, % | Total Area Shrinkage, % |
|---|---|---|---|---|---|
| EX-1 | PE-3 | 284 | 8 | 8 | 16 |
| EX-2 | PE-4 | 288 | 17 | 17 | 31 |
| EX-3 | PE-5 | 63 | 13 | 8 | 20 |
| EX-4 | PE-6 | 57 | 8 | 13 | 20 |
| EX-5 | PE-7 | 156 | 17 | 25 | 38 |

TABLE 3-continued

Details of indicator samples EX-1
to 8 and response to VHP exposure.

| Example | Sorbent | Sorbent Loading, gsm* | X-Axis Shrinkage, % | Y-Axis Shrinkage, % | Total Area Shrinkage, % |
|---|---|---|---|---|---|
| EX-6 | PE-8 | 156 | 25 | 25 | 44 |
| EX-7 | PE-9 | 146 | 63 | 50 | 81 |
| EX-8 | PE-10 | 165 | 50 | 50 | 75 |

*gsm = grams per square meter

Example 9 (EX-9)

Preparation of Perforated Circuit Sensor

A perforated sensor was prepared by laminating two 0.25 inch×1.5 inch (0.6 cm×3.8 cm) strips of 410M double coated tape to opposite edges of a 1.5 inch×1.5 inch (3.8 cm×3.8 cm) square piece of heat-shrink film. The heat-shrink film was then flipped over, and a line of silver ink ("SILVERJET DGH 55LT-25C") was applied to the heat-shrink film using a cotton tipped swab and allowed to thoroughly dry overnight at room temperature for 16 hours. Next, two 0.5 inch×1.5 inch (1.3 cm×3.8 cm) strips of 200MP lined transfer adhesive were laminated on the same side of the heat-shrink film as the silver ink, 0.2 inches (0.5 cm) from opposite edges of the film, running parallel to the strips of double coated tape. A razor blade was then used to perforate the film by cutting a series of small slits in a line down the center of the film between the two strips of transfer adhesive. The liner of one of the strips of double coated tape was removed and then the exposed adhesive of the tape was applied to the 2 inch×3 inch (5.1 cm×7.6 cm) glass slide. A rubber roller was then used to press the adhesive into the glass slide to ensure proper adhesion. The liner of the other strip of double coated tape was removed and the exposed adhesive of the tape applied to the glass slide so that the heat-shrink film was taut. A rubber roller was then used to press the adhesive into the glass slide and ensure proper adhesion.

The liners of the transfer adhesive were removed to expose the adhesive. The sorbent was added by pouring it over the exposed adhesive. To ensure good adhesion of the sorbent, a piece of weighing paper was placed over the sensor, and then a rubber roller was used to gently press the sorbent into the adhesive. The glass slide was then tipped on its side and lightly tapped to remove any loose sorbent.

A perforated sensor sample (EX-9) was prepared as described above using the sorbent PE-10. This sensor sample had a sorbent loading of 170 gsm. The sensor sample was exposed to VHP as described in the Procedure for Exposing Sensors to Vaporized Hydrogen Peroxide. Enough heat was generated during the exposure to activate the heat-shrink film which tore along the perforations completely disrupting the printed circuit of EX-9.

Example 10 (EX-10)

Preparation of Irreversible Temperature Indicator Based Sensor 3M polyester tape 8403 was placed on the front ends of a Telatemp Temperature Recorder label (Style No. 90859, 38-66° C.) to adhere the label face down on a 2×3 inch (5.1 cm×7.6 cm) glass slide taking care to ensure the tape did not cover any of the indicator sections. The liner on the back side of the label was removed to expose the adhesive and allow the sorbent to be bonded to the back of the label. The sorbent was added by pouring it over the exposed adhesive. To ensure good adhesion of the sorbent, a piece of weighing paper was placed over the entire sample and a rubber roller was used to lightly press the sorbent into the adhesive so as to take care to not crush the sorbent particles or break the glass slide. The glass slide was then tipped on its side and lightly tapped to remove any loose sorbent.

A comparative example (CE-1) was prepared by attaching the Teletemp Temperature Recorder label face down on a glass slide with its back liner removed as described above, but no sorbent was adhered to the label.

Each sensor sample (CE-1 and EX-10) was exposed to VHP as described in the Procedure for Exposing Sensors to Vaporized Hydrogen Peroxide. The sorbent used to prepare each irreversible temperature indicator based sensor sample, the sorbent loading, and the peak temperature indicated on the label for CE-1 and EX-10 after exposure to VHP are summarized in Table 4. The peak temperature for CE-1 did not exceed the temperature at which the VHP exposure process was performed (50° C.).

TABLE 4

Details of sensor samples CE-1 and EX-10
and their response to VHP exposure.

| Example | Sorbent | Sorbent Loading, gsm* | Peak Temperature Indicated, ° C. |
|---|---|---|---|
| CE-1 | none | 0 | 49 |
| EX-10 | PE-10 | 186 | 66 |

*gsm = grams per square meter

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A hydrogen peroxide sterilization sensor comprising:
a backing substrate comprising at least one reservoir;
a thermal indicator component disposed on the backing substrate comprising a heat-shrinkable film;
a visual indicator disposed on the backing substrate;
a reactant-functional porous sorbent disposed in the at least one reservoir of the backing substrate and in thermal contact with the heat-shrinkable film;
a reactant comprising a material that reacts exothermically with hydrogen peroxide, wherein the reactant is impregnated in the reactant-functional porous sorbent; and
an adhesive disposed at least partially on the backing substrate and between the reactant-functional porous sorbent and the heat-shrinkable film, wherein the adhesive is configured to lock the heat-shrinkable film in place,
wherein the heat-shrinkable film is configured to dimensionally change in response to the heat generated from the exothermic reaction of the reactant-functional porous sorbent to expose the visual indicator.

2. The sterilization sensor of claim 1, wherein the reactant comprises potassium iodide, iron (II) acetate, or a combination thereof.

3. The sterilization sensor of claim 1, wherein the reactant comprises potassium iodide.

4. The sterilization sensor of claim 1, which detects hydrogen peroxide at a concentration of 100 parts per million (ppm) or greater in a gas.

5. The sterilization sensor of claim 1, wherein an irreversible temperature indicator is present and comprises a thermochromic dye.

6. The sterilization sensor of claim 1, wherein the reactant-functional porous sorbent comprises activated carbon, porous silica, zeolites, porous organic polymer, or combinations thereof.

7. The sterilization sensor of claim 1, wherein the reactant is present in an amount of 1 wt. % to 80 wt. %, based on the total weight of the reactant-functional porous sorbent.

8. The sterilization sensor of claim 1, wherein the reactant-functional porous sorbent is adhered to the thermal indicator component.

9. An array comprising a plurality of the hydrogen peroxide sterilization sensors of claim 1.

10. A method of detecting hydrogen peroxide in a sterilization process, the method comprising:
providing a hydrogen peroxide sterilization sensor of claim 1;
allowing hydrogen peroxide to contact the reactant to generate thermal energy sufficient to cause a response from the thermal indicator component;
detecting that conditions for the hydrogen peroxide sterilization have been met; and
exposing the visual indicator when the conditions for the hydrogen peroxide sterilization have been met.

11. The method of detecting of claim 10, wherein the exposing the visual indicator comprises exposing an underlying image.

* * * * *